W. S. WRIGHT.
CASING FOR TRANSMISSION GEARINGS.
APPLICATION FILED FEB. 17, 1922.
1,430,346.
Patented Sept. 26, 1922.
2 SHEETS—SHEET 1.
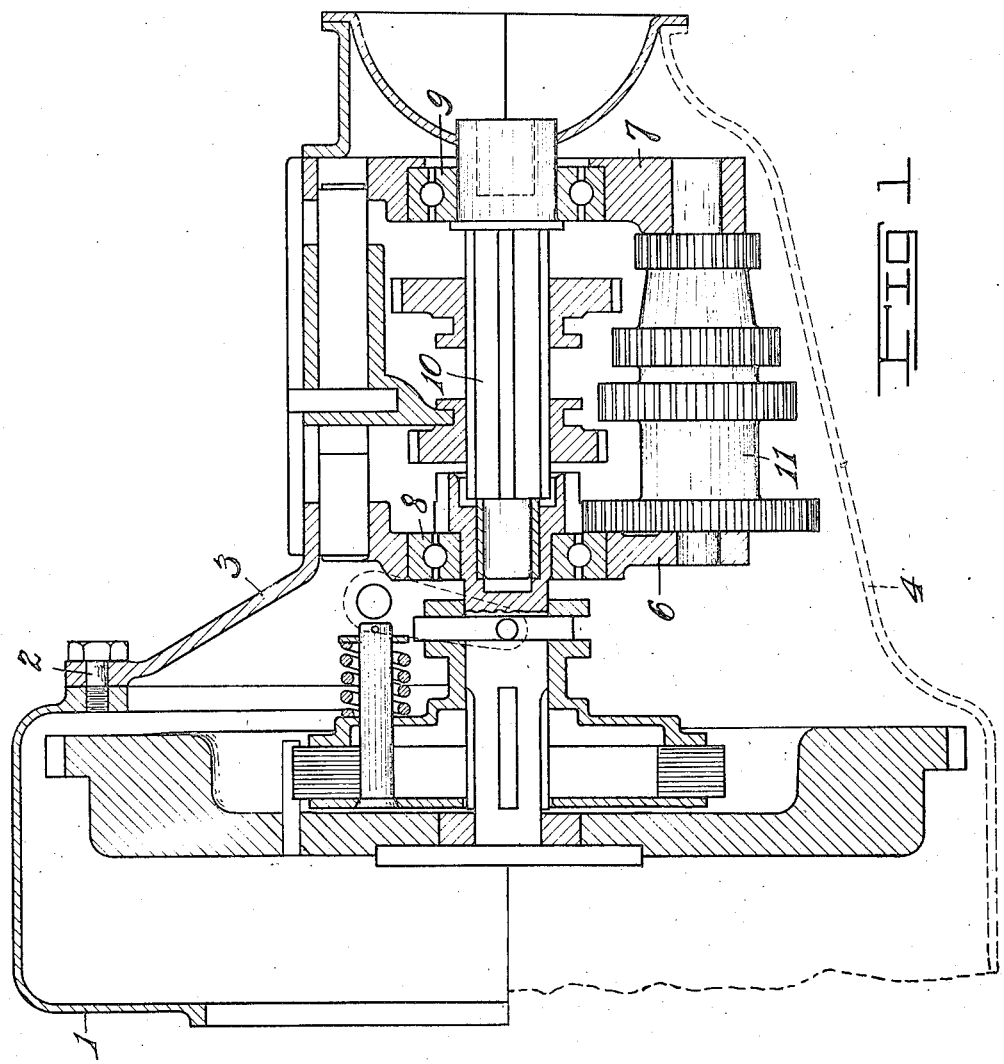
Inventor
W. S. Wright
By
Attorney

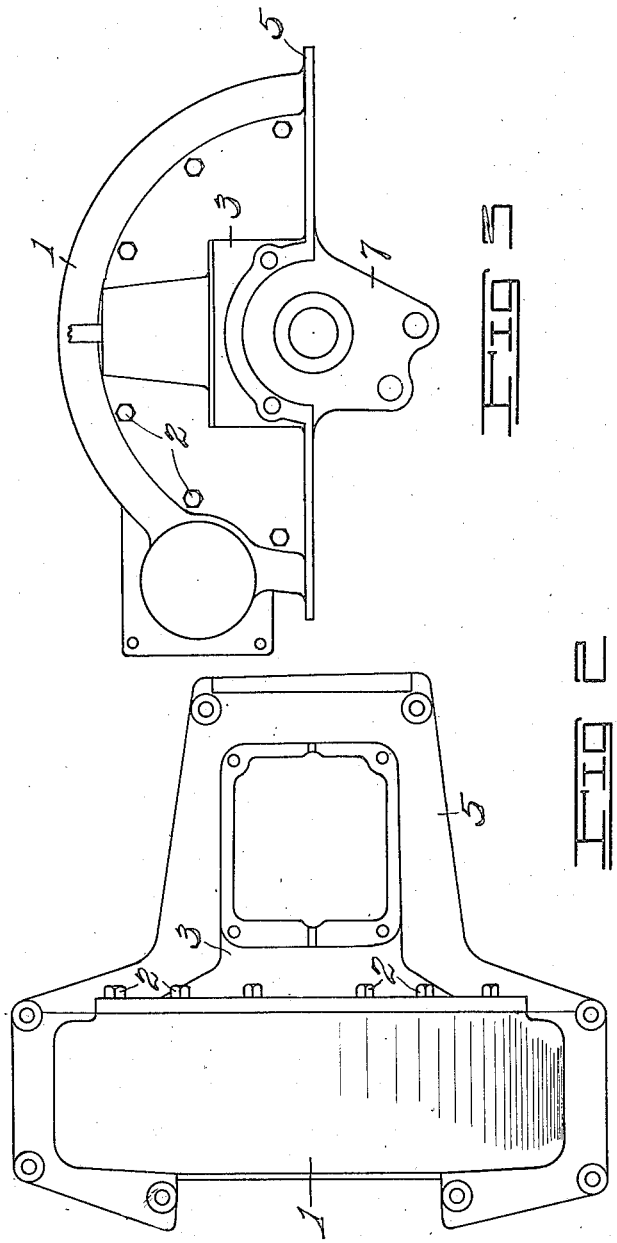

Patented Sept. 26, 1922.

1,430,346

UNITED STATES PATENT OFFICE.

WILLIAM S. WRIGHT, OF NEWARK, OHIO.

CASING FOR TRANSMISSION GEARINGS.

Application filed February 17, 1922. Serial No. 537,212.

*To all whom it may concern:*

Be it known that I, WILLIAM S. WRIGHT, a citizen of the United States of America, and resident of Newark, county of Licking, and State of Ohio, have invented certain new and useful Improvements in Casings for Transmission Gearings, of which the following is a specification.

This invention relates broadly to change-speed transmission gearings, and more specifically to a case or housing for the transmission gearing of motor vehicles.

The primary object of the invention is to provide a case for transmission gearing, which is divided in the center line of the engine and in which the gears with their shafts and the driving clutch are carried wholly by the upper half or section of the case.

A further object is to provide a gear case of the character mentioned in which both the gearing and the driving clutch may be bodily removed without in any way disturbing the lower half, or pan portion, of the gear case, said gearing being wholly supported by the upper half of the case and, consequently being removable with said upper half.

A still further object is to provide a transmission gearing of the three forward speed and reverse type and a case therefor divided in the center line of the engine, said gearing being borne by or suspended from the upper half of the case with the change-speed gearing located below the center line of the engine—that is, within the lower or pan portion—and being removable with said upper half as a single unit.

I am aware that it has heretofore been proposed to provide a change-speed transmission in which a part of the gearing is borne by an upper detachable half of a gear case, but in the transmission referred to the change-speed gearing is located wholly within said upper half—that is, above the center line of the engine—and the main gears are supported by the lower half of the crank case, and in fitting the two cases together with a piece of packing between them to make an oil-tight joint—it is impossible to obtain proper alinement of the shafts or correct spacing of the gears for proper operation. This construction or arrangement is highly objectionable for various other reasons, among which may be mentioned that the elevation of the upper half is necessarily increased to the extent that the proper positioning of the floor boards of the car is seriously interfered with if, indeed, such is not positively prevented; also, that in their elevated position, the change-speed gears are above the oil-splash level and do not receive the required lubrication.

As hereinbefore indicated, it is the chief aim of the present invention to provide a transmission construction in which the above mentioned objectionable features of prior structures are eliminated.

In describing the invention in detail, reference is herein had to the accompanying drawings, in which—

Figure 1 is a vertical longitudinal section of the invention with the lower, or pan, section of the case shown in dotted lines;

Figure 2 is a top plan view of the same, reduced, showing the cover of the gear case removed; and—

Figure 3 is a front end elevation of the upper half or section of the case with the casing for the ball joint for the drive-shaft case removed.

Referring to said drawings, 1 indicates the upper half of a fly wheel housing to which is attached, as by bolts 2, the upper half 3 of a transmission gear casing. Said casing section 3 is designed to seat upon a lower casing section 4, shown in dotted lines in Fig. 1. The dividing line of said sections, except at the front end, is substantially in a common horizontal plane with the center line of the drive from the engine (not shown) and the upper section 3 has flanges 5 adapted to seat upon and to be bolted to similar flanges (not shown) formed on the lower section 4. Said lower section which constitutes a receptacle, container or pan for lubricant, is shaped to form both the lower portion of the gear case and the lower portion of the fly-wheel housing and, preferably, is integral with and forms a rear end extension of the usual engine pan, although, as is obvious, it may be separate from the engine pan and be attached to the rear end of the engine in any suitable well-known manner.

Formed integral with the upper section 3 of the gear case are two relatively spaced transverse webs 6 and 7 which, when said upper section is superposed upon the lower section 4, depend within the latter to a level adjacent to the bottom thereof. Said webs form supports not only for the bearings 8 and 9 carrying the main gear shaft 10, but also for the shafts which carry the change-speed gears, one such shaft 11 being herein shown.

The fly-wheel 11, which is enclosed by the housing 1, carries rearwardly-directed pins 12 by which the plates included in the driving clutch 13 are supported in proper relation to said fly-wheel.

As is apparent, when access to or removal of the gears is required, the upper sections 1 and 3 of the flywheel housing and the gear case are first detached from the underlying case section or pan extension, as the case may be; then, with the rear end of said upper case section slightly elevated, said sections 1 and 3 are shifted rearwardly to disengage the clutch 13 from the pins 12, whereupon said sections are lifted off, carrying therewith the entire change-speed transmission gearing.

It will be noted that all of the gears are so located with respect to the lower case section or pan extension that proper lubrication thereof is constantly maintained even though the oil level be quite low.

What is claimed is—

1. A casing for change-speed transmission gearings, comprising two sections separable approximately in the horizontal plane of the main drive, the upper section carrying the entire transmission gearing with the change-speed gears suspended within the interior of the lower section and also carrying the driving clutch.

2. A change-speed transmission gearing comprising upper and lower casing sections separable approximately in the horizontal plane of the main drive, supports depending interiorly from the upper section, a main gear shaft and change-speed gear shafts journaled in said supports with the last mentioned shafts located below the first mentioned shaft, and a driving clutch carried by the foremost of said supports, said shaft and said clutch being removable as a unit with said lower section.

3. A change-speed transmission gearing comprising upper and lower casing sections separable approximately in the horizontal plane of the main drive, a main gear shaft and change-speed gear shafts located within said casing, and a driving clutch carried in front of said main gear shaft; said shafts and said clutch being suspended from and removable as a unit with the upper of said sections.

4. The combination with an engine pan having a rear end extension forming the lower part of a fly-wheel and transmission casing, of upper fly-wheel and transmission casing sections complemental to and seated upon said pan extension, said sections being removably attached to said extension approximately in the horizontal plane of the main drive, said sections having the driving clutch and the entire transmission gearing suspended therefrom and removable therewith.

5. The combination with an engine pan having a rear end extension forming the lower part of a transmission casing, of an upper transmission casing section complemental to and seated upon said pan extension, said section being removably attached to said extension approximately in the horizontal plane of the main drive, supports depending from said section, a main gear shaft and change-speed gear shafts journaled in said supports with the last mentioned shafts located adjacent to the bottom of said extension and a driving clutch supported by the foremost of said supports, said shafts and said clutch being removable as a unit with said section.

In testimony whereof, I affix my signature in presence of two subscribing witnesses.

WILLIAM S. WRIGHT.

Witnesses:
 BESSIE B. WRIGHT,
 WILLIAM C. MILLER.